United States Patent
Saitou

(10) Patent No.: US 10,788,668 B2
(45) Date of Patent: Sep. 29, 2020

(54) DISPLAY DEVICE

(71) Applicant: Nippon Seiki Co., Ltd, Niigata (JP)

(72) Inventor: Kazuhiro Saitou, Tendo (JP)

(73) Assignee: NIPPON SEIKI CO., LTD., Niigata (JP)

( * ) Notice: Subject to any disclaimer, the term of this patent is extended or adjusted under 35 U.S.C. 154(b) by 173 days.

(21) Appl. No.: 16/085,433

(22) PCT Filed: Mar. 14, 2016

(86) PCT No.: PCT/JP2016/058050
§ 371 (c)(1),
(2) Date: Sep. 14, 2018

(87) PCT Pub. No.: WO2017/158709
PCT Pub. Date: Sep. 21, 2017

(65) Prior Publication Data
US 2019/0079289 A1    Mar. 14, 2019

(51) Int. Cl.
*G02B 27/01* (2006.01)
*B60K 35/00* (2006.01)
*B60R 11/00* (2006.01)

(52) U.S. Cl.
CPC .......... *G02B 27/0149* (2013.01); *B60K 35/00* (2013.01); *B60K 2370/1529* (2019.05);
(Continued)

(58) Field of Classification Search
CPC ........ G02B 27/0149; G02B 2027/0154; G02B 2027/0161; G02B 27/0179; G02B 2027/0156; B60K 35/00; B60K 2370/1529
(Continued)

(56) References Cited

U.S. PATENT DOCUMENTS

| | | | |
|---|---|---|---|
| 2013/0100535 A1 | 4/2013 | Ruyten | |
| 2017/0242257 A1* | 8/2017 | Tatekawa | G02B 27/0149 |
| 2018/0373034 A1* | 12/2018 | Saitou | B60K 37/04 |

FOREIGN PATENT DOCUMENTS

| | | |
|---|---|---|
| JP | 2013-154817 A | 8/2013 |
| JP | 2014-201104 A | 10/2014 |
| JP | 2015-000710 A | 1/2015 |

OTHER PUBLICATIONS

Yazaki, JP2014-201104 "Vehicular display device", cited by applicant, English translation obtained via google patents on Apr. 27, 2020 (Year: 2014).*

(Continued)

*Primary Examiner* — Kristina M Deherrera
(74) *Attorney, Agent, or Firm* — McDermott Will & Emery LLP

(57) ABSTRACT

There is provided a display device which has a shutter capable of being accommodated in a compact space and a simplified operation mechanism, and can be reduced in size. The display device of the present invention is characterized by including: a housing having a top plate with an opening and a pair of opposed side plates; a drive member which is provided on at least one of the pair of side plates and slidable relative to the at least one of the side plates, the drive member having a cam structure and a drive rack gear; a display member that is engaged with the cam structure and movable through the opening; and a movable shutter capable of closing the opening along the top plate by a drive transfer unit that is engaged with the drive rack gear.

8 Claims, 9 Drawing Sheets

(52) U.S. Cl.
CPC ... *B60K 2370/67* (2019.05); *B60R 2011/0092* (2013.01); *G02B 2027/015* (2013.01); *G02B 2027/0154* (2013.01); *G02B 2027/0156* (2013.01)

(58) Field of Classification Search
USPC .......................................................... 359/362
See application file for complete search history.

(56) References Cited

OTHER PUBLICATIONS

International Search Report for related International Application No. PCT/JP2016/058050, dated Jun. 14, 2016; English translation provided; 4 pages.

\* cited by examiner

DISPLAY DEVICE

CROSS-REFERENCE TO RELATED APPLICATIONS

This application is a U.S. National Stage entry of PCT Application No: PCT/JP2016/058050 filed Mar. 14, 2016, the contents of which are incorporated herein by reference.

TECHNICAL FIELD

The present invention relates to a display device.

BACKGROUND ART

Recent years have started to find, for example, vehicles in which a so-called head-up display is mounted near the driver's seat. The head-up display is a device for displaying drive assistance information as images such as information of the vehicle, road information, or navigation information on a translucent display member called an image combiner (hereafter, also referred to simply as the combiner).

The head-up display displays, for example, the drive assistance information mentioned above as a virtual image in front of the windshield. The drive assistance information is visually identified from the driver as overlapped with a view ahead of the vehicle. Thus, the head-up display is capable of providing the driver with the drive assistance information without the need of moving the driver's line of sight.

As one of those head-up displays, an on-board head-up display device which is provided with a combiner for displaying images and a shutter is disclosed in Patent Literature 1. In the head-up display device, the combiner is developed via an opening. When the combiner is not in use, the shutter covers the opening. On the other hand, when the combiner is developed for use, the shutter is retracted from the opening.

Furthermore, a combiner displacement mechanism by which a cylindrical cam mechanism is used to move the combiner up and down between a developed position and an accommodated position is disclosed in Patent Literature 2.

CITATION LIST

Patent Literature

Patent Literature 1: Japanese Patent Application Laid-Open No. 2013-154817
Patent Literature 2: Specification of U.S. Patent Application Publication No. 2013/100535

SUMMARY OF INVENTION

Technical Problem

The area such as the dashboard around the driver's seat of a vehicle in which the head-up display device is mounted is originally a confined space with a number of densely arranged devices. Thus, such a head-up display which is reduced in size and mountable in as small footprint (volume) as possible has been desired.

In contrast to this, the head-up display device having a shutter mechanism as disclosed in Patent Literature 1 is required to accommodate the shutter in an area beside the opening when the combiner is developed. That is, the area which is twice that of the shutter is required for the shutter to move.

On the other hand, in the head-up display device having a cylindrical cam mechanism such as the one disclosed in Patent Literature 2, the cylindrical cam included therein causes a low degree of flexibility in design and difficulty with reduction in size.

The present invention has been made in view of the points mentioned above. It is therefore an object of the invention to provide a display device, for example, which has a shutter capable of being accommodated in a compact space and a simplified operation mechanism, and can be reduced in size.

Solution to Problem

The invention according to claim 1 is a display device characterized by including: a housing having a top plate with an opening and a pair of opposed side plates; a drive member which is provided on at least one of the pair of side plates and slidable relative to the at least one of the side plates, said drive member having a cam structure and a drive rack gear; a display member that is engaged with the cam structure and movable through the opening; and a shutter configured to open and close the opening along the top plate by a drive transfer unit that is engaged with the drive rack gear.

DESCRIPTION OF EMBODIMENTS

Now, an embodiment of the present invention will be described in more detail below. In the descriptions below, a head-up display (HUD) having a combiner as a display unit will be described as an example of display devices.

First Embodiment

[Entire Structure]

Figure 1:
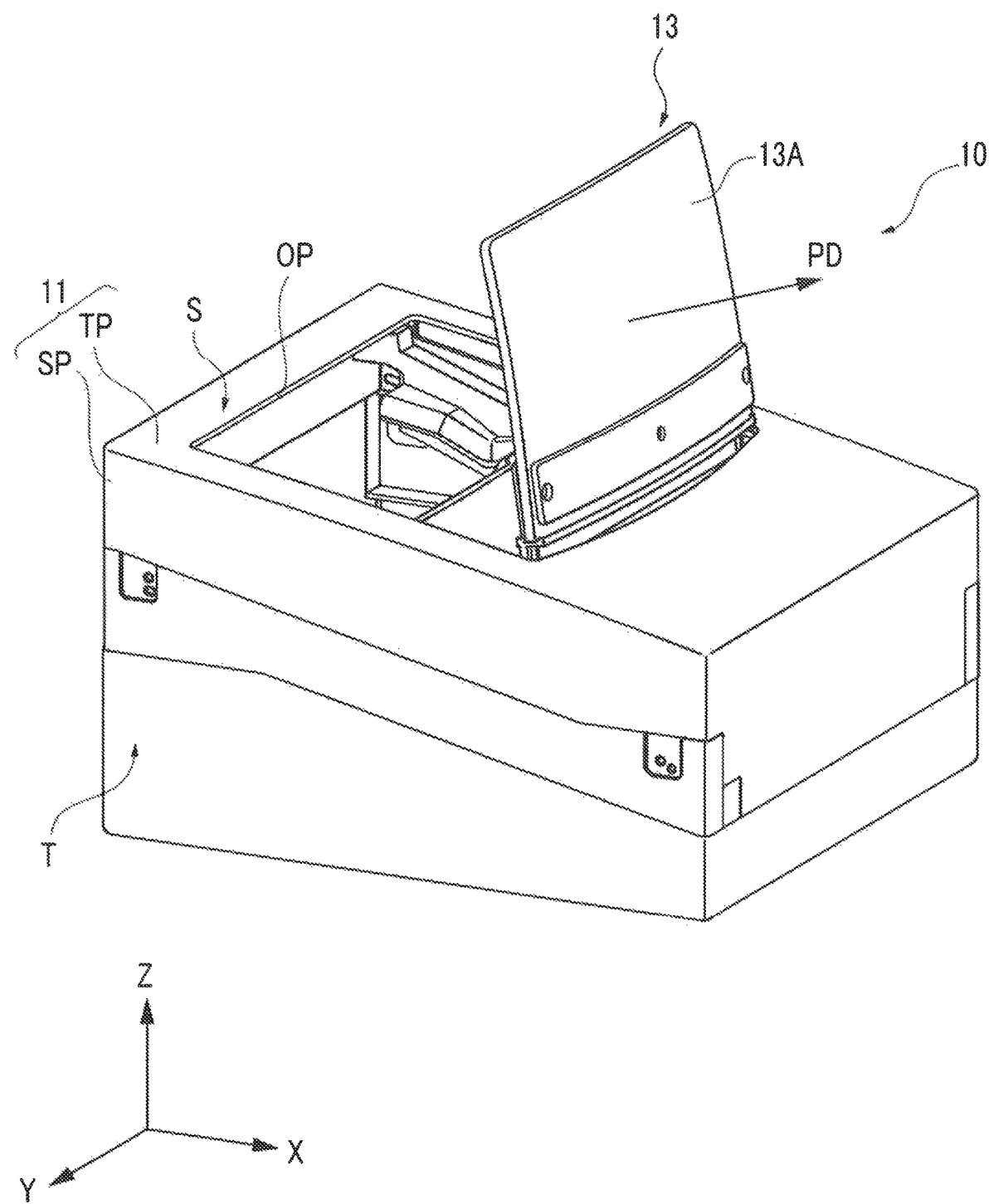
FIG. 1 is a perspective view illustrating a display device according to a first embodiment at a display operating state.

FIG. 1 is a perspective view illustrating a display device 10 according to a first embodiment at a display operating state (when the combiner is developed.) Furthermore, FIG.

2 is a perspective view illustrating the display device 10 at non-display operating state (when the combiner has been accommodated). The display device 10 is mounted in mobile bodies such as automobiles. For example, when mounted in an automobile, the display device 10 is mounted by being accommodated in the dashboard.

A housing 11 has a planar top plate TP. The top plate TP is provided with a generally rectangular opening OP formed therein. The housing 11 also has a pair of planar side plates SP which are opposed to each other and which extend from opposing sides of the top plate TP generally vertically relative to the top plate TP. The side plates SP include a plurality of plate structures (not illustrated) that overlap each other.

In the descriptions below, the direction generally along the line of intersection between a plate surface S of the top plate TP and a plate surface T of the side plate SP is defined as the depth (back-and-forth) direction (the X-axis direction). Furthermore, the direction perpendicular to the plate surface T of the side plate SP is defined as the width direction (the Y-axis direction). Furthermore, the direction generally perpendicular to the plate surface S of the top plate TP is defined as the height (up-and-down) direction (the Z-axis direction).

The image combiner unit (hereafter referred to as the combiner unit) 13 serving as a display member has a planar translucent combiner section 13A. The combiner section 13A has a plate surface that is convexly curved relative to one direction (the direction of arrow PD in the figure). For example, the combiner section 13A is configured such that an irradiating beam of light incident from the concave side causes a virtual image to be formed in the convex-side space region.

Figure 2:
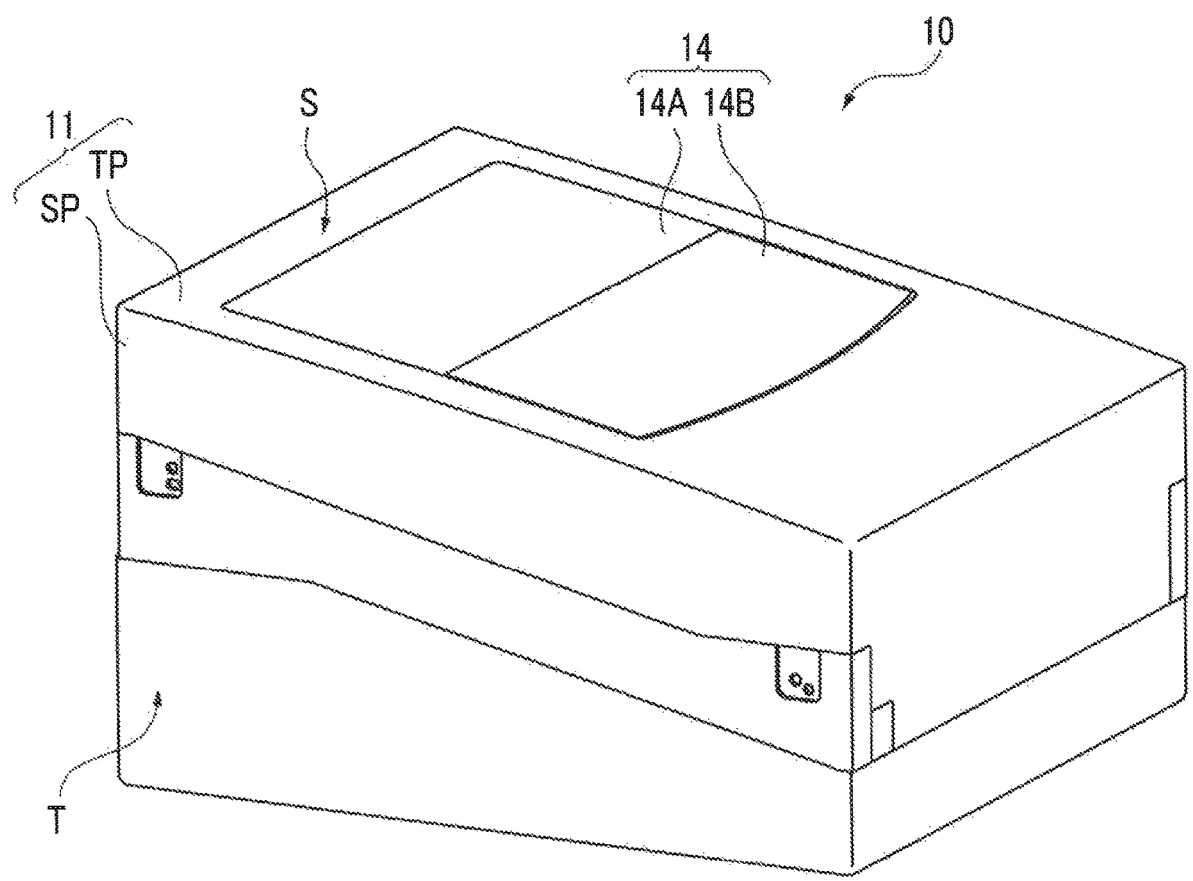
FIG. 2 is a perspective view illustrating the display device according to the first embodiment at a non-display operating state.
Figure 2:
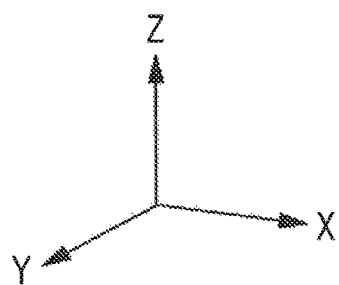

As shown in FIG. 1, at the time of display operation (in a display operating state), the combiner unit 13 is protruded from inside the housing 11, i.e., from the space between the side plates SP and is erected. That is, the combiner unit 13 is at a developed position. Furthermore, as shown in FIG. 2, at the time of non-display operation, the combiner unit 13 is rotated to be accommodated in the combiner housing 11, i.e., the space between the side plates SP. That is, at the time of non-display operation, the combiner unit 13 is at an accommodated position in the accommodation space formed between the two side plates SP.

Furthermore, at the time of non-display operation (the non-display operating state), the opening OP is covered with a shutter 14. The shutter 14 is formed of two shutter members 14A and 14B that are movable along the plate surface S of the top plate TP. The shutter member 14B moves by following the movement of the shutter member 14A. The shutter members 14A and 14B move so as to open the opening OP and are then accommodated in the housing 11, that is, are accommodated in a forward region wherein the combiner is positioned at the developed state.

More specifically, for example, before power is supplied to the display device 10 (before the engine of the automobile is started or before the ignition is turned ON), the combiner unit 13 is accommodated at the accommodated position inside the housing 11. Subsequently, when power is supplied to the display device 10, the combiner unit 13 is rotated from the accommodated position and disposed at the developed position. The combiner unit 13 is rotatably supported on the side plates SP and moved between the accommodated position and the developed position.

Figure 3:
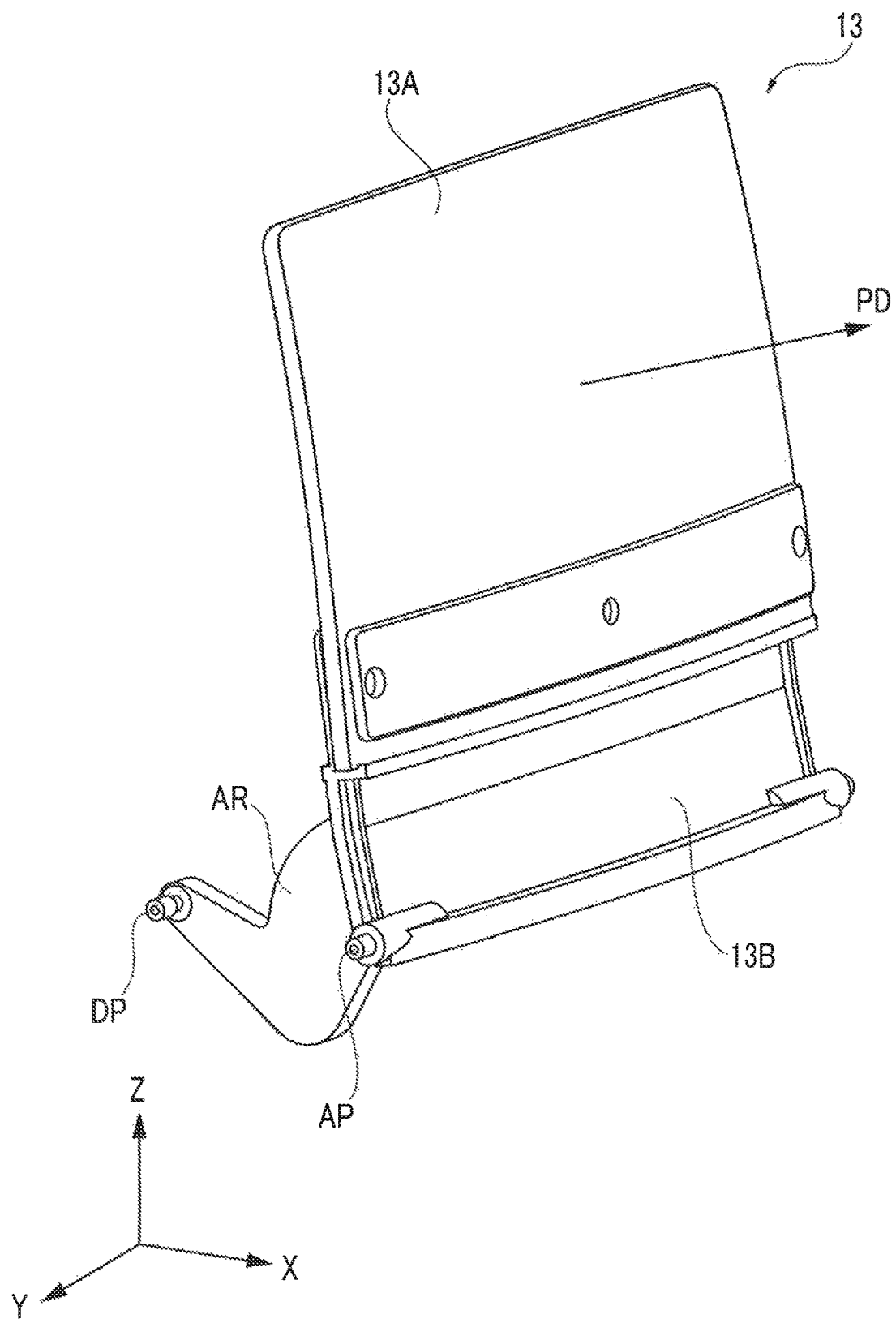
FIG. 3 is a perspective view illustrating a combiner unit of the display device according to the first embodiment.

FIG. 3 illustrates an expanded view of the combiner unit 13. Note that in the descriptions below, the convex direction of the combiner section 13A (the direction of arrow PD in the figure) at the time of display operation (when developed) is defined as the forward of the display device 10, and the opposite thereto is defined as the backward.

As shown in FIG. 3, the combiner section 13A is securely held by a holder section 13B. On each of both sides of the holder section 13B, pin structures that are protruded from the holder section 13B in the width direction (the Y-axis direction) of the display device 10 are formed.

A rotation axis pin AP serving as a first pin structure is formed on both sides of the holder section 13B. Each of the rotation axis pins AP is rotatably secured to each of the side plates SP.

A drive pin DP serving as a second pin structure is provided on an arm AR which extends backward relative to the rotation axis pin AP, for example, radially outwardly relative to the drive pin on one side of the holder section 13B. The drive pin DP is driven by a cam structure formed on a drive plate (not illustrated) provided slidably (slidingly movably) along the side plates SP, and is rotationally moved about the rotation axis of the rotation axis pin AP, that is, about the securing axis of the side plates SP.

In the descriptions below, the direction of the tip of the combiner section 13A, when viewed from the holder section 13B at the time of display operation, is defined as the upward of the display device 10, and the opposite thereto is defined as the downward. For example, when the display device 10 is mounted in the dashboard of a mobile body (for example, an automobile), the windshield of the mobile body exists in the forward of the display device 10, that is, the direction of arrow PD in the figure. Furthermore, it is assumed that a passenger of the mobile body views the combiner unit 13 from the backward of the display device 10.

[Displacement Mechanism]

A description will now be given of a displacement mechanism configured to move the combiner unit 13 and the shutter 14. The displacement mechanism is provided along at least one of the pair of side plates SP. In the following descriptions, the configuration of the displacement mechanism on one of the side plates SP and the operation of the displacement mechanism will be described.

When the displacement mechanism is provided on both of the pair of side plates SP, the displacement mechanism may also be formed to be symmetric with respect to a symmetric plane (symmetric about a mirror plane) that includes the axis along the back-and-forth direction of the display device (the X-axis) and the axis along the vertical direction (the Z-axis). Furthermore, the combiner unit 13 and the shutter 14 may also be formed to be symmetric with respect to the symmetric plane.

[Combiner Unit Displacement Mechanism]

Figure 4:
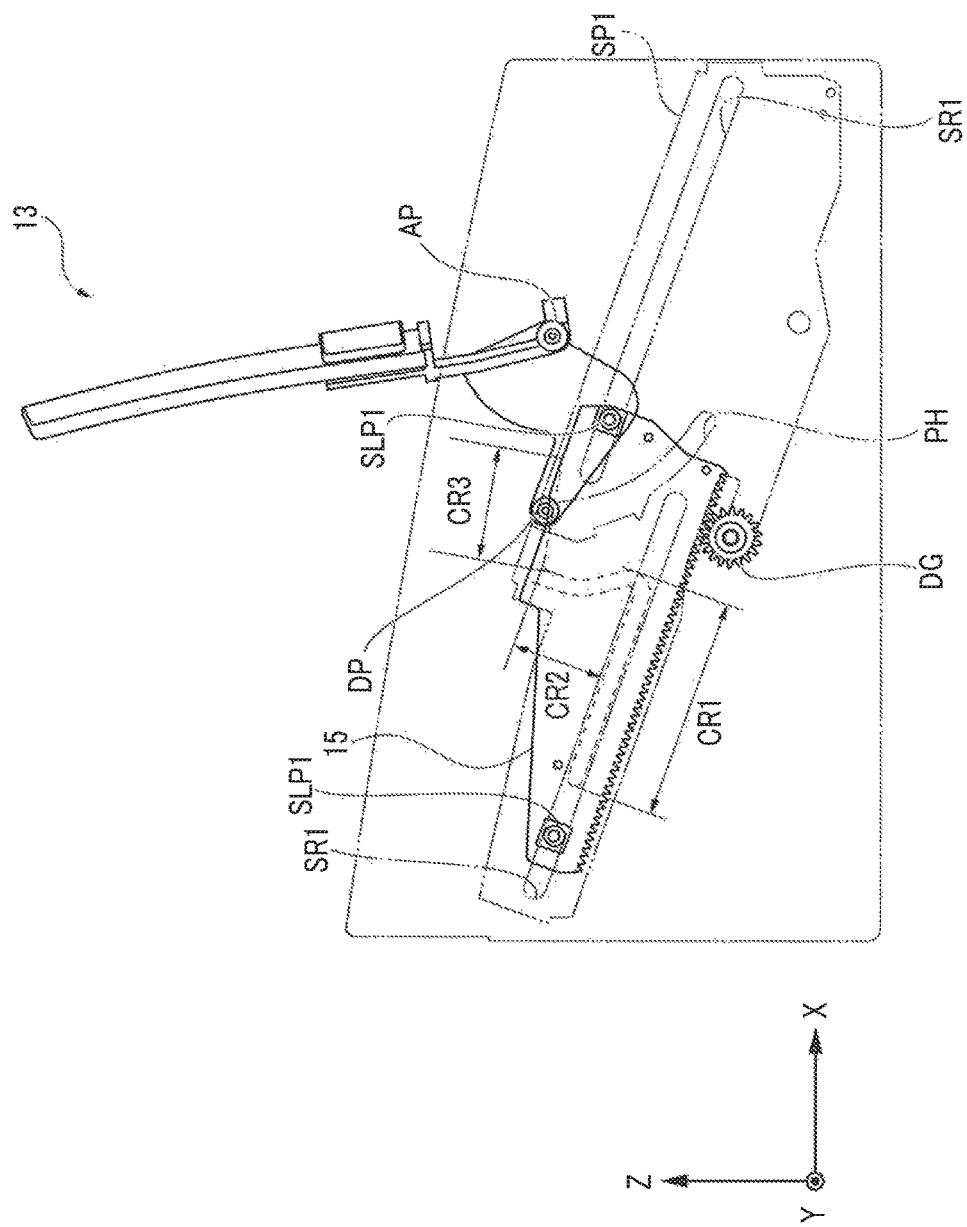
FIG. 4 is a side view illustrating a combiner displacement mechanism of the display device according to the first embodiment.

FIG. 4 is a side view of the displacement mechanism configured to rotationally move the combiner unit 13. The combiner 13 is biased by biasing means in a direction in which the combiner 13 rotates backwardly about the rotation axis of the rotation axis pin AP.

A drive plate guide plate SP1 is one of the plurality of plate structures included in the side plates SP mentioned above. The drive plate guide plate SP1 is provided with two slide rails SR1 which have an elongated-hole shape and extend in the back-and-forth direction of the display device 10. The two slide rails SR1 extend in parallel to each other and are formed to be offset in the back-and-forth direction.

Furthermore, the drive plate guide plate SP1 is provided with a clearance hole PH formed to extend along an arc about the rotation axis of the rotation axis pin AP. The drive pin DP is inserted into the clearance hole PH and the tip thereof passes through the clearance hole PH. That is, the drive pin DP penetrates through the drive plate guide plate SP1 and is movable along the clearance hole PH. The drive pin DP is movable along the clearance hole PH but not guided by the clearance hole PH. That is, the clearance hole PH serves as a clearance for the drive pin DP.

On the bottom center of the drive plate guide plate SP1, a drive gear DG that is rotatably held by the drive plate guide plate SP1 is provided. The drive gear DG is rotated by a driving source (not illustrated) such as an electric motor.

Figure 5:
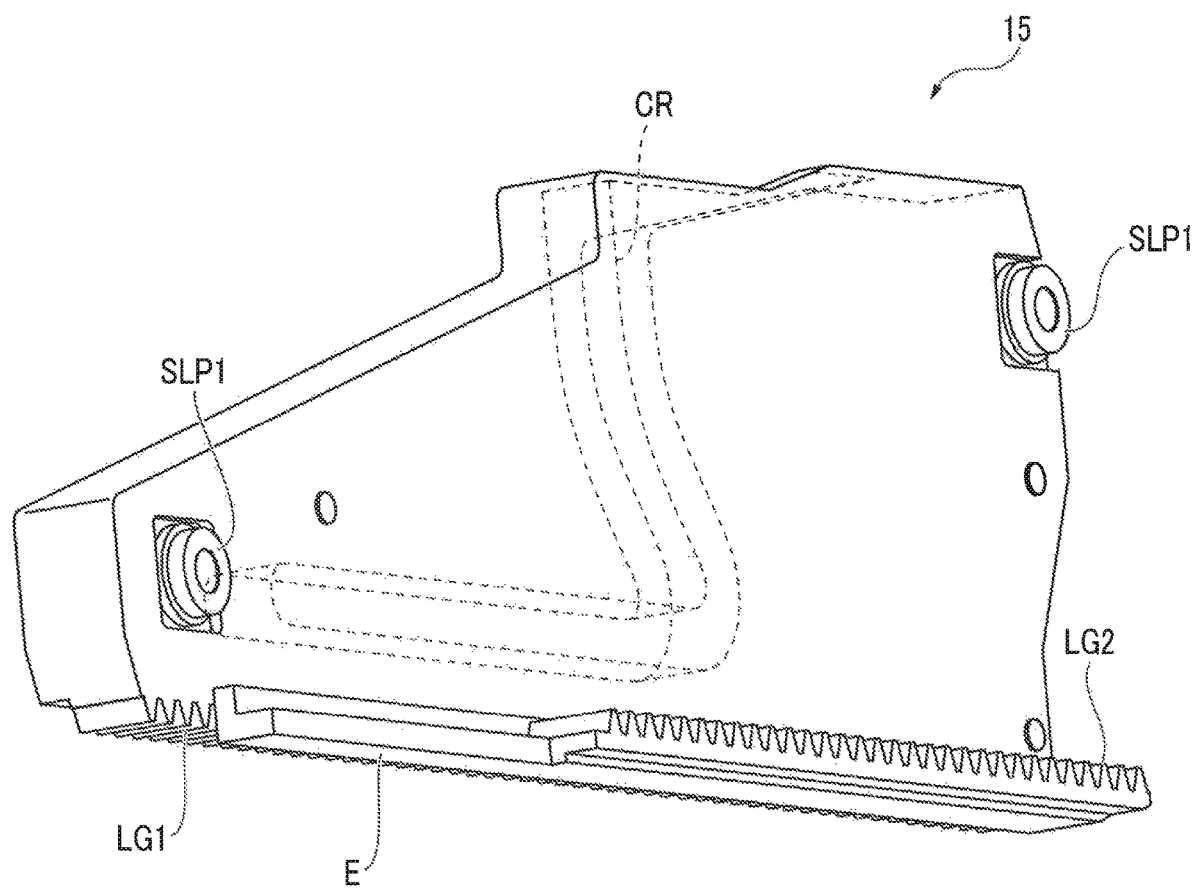
FIG. 5 is a perspective view illustrating a drive member of the display device according to the first embodiment.

FIG. 5 illustrates a perspective view of a drive plate 15 as a drive member that is guided by the drive plate guide plate SP1 and thereby moved. The drive plate 15 is a planar member. A slide pin SLP1 that is protruded perpendicularly from both plate sides of the drive plate 15 is provided at each of a front end portion and a rear end portion of the drive plate 15. As shown in FIG. 4, the slide pin SLP1 protruded from one side of the drive plate 15 is inserted into a slide rail SR1 of the drive plate guide plate SP1 to be slidingly movable (slidable).

Note that the slide pin SLP1 protruded from the other side of the drive plate 15 is slidingly movably inserted into a slide rail formed on a planar member (not illustrated) provided along the other side of the drive plate 15. That is, the drive plate 15 is slidingly movable along the direction in which the slide rails SR1 extend.

The drive plate 15 is provided with a rack gear LG1 which is formed on the lower surface of the drive plate 15 along the back-and-forth direction of the display device 10, that is, along the sliding direction of the drive plate 15. The rack gear LG1 mates with the drive gear DG. That is, the drive plate 15 is configured to slidingly move along the direction, in which the slide rails SR1 extend, in response to the rotation of the drive gear DG.

On a side of the rack gear LG1, an extension E that is formed to be protruded from the surface of the drive plate 15 opposite to the drive plate guide plate SP1 is provided. The extension E extends in the back-and-forth direction of the drive plate 15, that is, in the sliding direction, and has an upper surface which is provided with a rack gear LG2 serving as a drive rack gear structure. That is, the tooth surface of the rack gear LG2 is oriented opposite to that of the rack gear LG1.

The rack gear LG2 is formed from the front end of the drive plate 15 without reaching the rear end of the drive plate 15. That is, the rack gear LG2 is shorter in the entire gear length than the rack gear LG1.

The drive plate 15 has a cam groove CR serving as a cam structure on an inner side surface thereof which surface faces the drive plate guide plate SP1. The drive pin DP is inserted in the cam groove CR. The drive pin DP is passes through and is protruded from the clearance hole PH of the drive plate guide plate SP1. That is, the drive pin DP is slidingly movable along the cam groove CR.

The cam groove CR has a non-operation cam region CR1 serving as a first cam region that extends in parallel to the sliding direction of the drive plate 15. The cam groove CR also has a development cam region CR2 serving as a second cam region and an adjustment cam region CR3 serving as a third cam region. The development cam region CR2 is formed continuously from an end of the non-operation cam region CR1 and extends at an angle to the sliding direction of the drive plate 15.

The development cam region CR2 is formed continuously from the end of the non-operation cam region CR1 and extends at a large angle relative to the sliding direction of the drive plate 15. Furthermore, the adjustment cam region CR3 is formed continuously from the end opposite to the end of the development cam region CR2 that continues to the non-operation cam region CR1. The adjustment cam region CR3 extends at an angle nearly parallel to the sliding direction of the drive plate 15. That is, the adjustment cam region CR3 extends at an angle relative to the sliding direction of the drive plate 15, the angle being less than that at which the development cam region CR2 extends relative thereto.

Because the cam groove CR is formed as described above, the combiner unit 13 rotates in response to the sliding of the drive plate 15 as described below. First, when the drive plate 15 is located at the foremost portion, that is, when the slide pin SLP1 is located at the foremost portion of the slide rail SR1, the drive plate 15 starts to slidingly move backward, and the drive pin DP is never moved while the drive pin DP is located within the non-operation cam region CR1. That is, the drive pin DP moves relative to the drive plate 15, but never moves relative to the drive plate guide plate SP1. Thus, while the drive pin DP is located in the non-operation cam region CR1, the combiner unit 13 is lying along the back-and-forth direction of the display device 10 and completely accommodated in the housing 11.

Subsequently, when the drive plate 15 further slidingly moves backward and the drive pin DP comes into the development cam region CR2, the drive pin DP abruptly rises and moves along an arc about the rotation axis pin AP. That is, the combiner unit 13 rotationally moves about the rotation axis pin AP so as to be raised from the lying state.

While the drive plate 15 continues to slidingly move backward, and the drive pin DP reaches the transition portion between the development cam region CR2 and the adjustment cam region CR3, the combiner unit 13 is raised, while being rotated, and passes through the opening OP (see FIG. 1) so as to be protruded from the housing 11 and developed.

When the drive plate 15 further slidingly moves backward and the drive pin DP reaches the adjustment cam region CR3, the combiner unit 13 is completely raised as shown in FIG. 4 and developed to outside the housing 11.

While the drive pin DP is located in the adjustment cam region CR3, the amount of movement of the drive pin DP is considerably less than the amount of sliding movement of the drive plate 15 in the development cam region CR2. In other words, the combiner unit 13 slightly rotationally moves for the sliding movement of the drive plate 15. This, while the drive pin DP is located in the adjustment cam region CR3, it is possible to perform an angle adjustment operation of the combiner unit 13 by the sliding movement of the drive plate 15.

[Shutter Displacement Mechanism]

Figure 6:
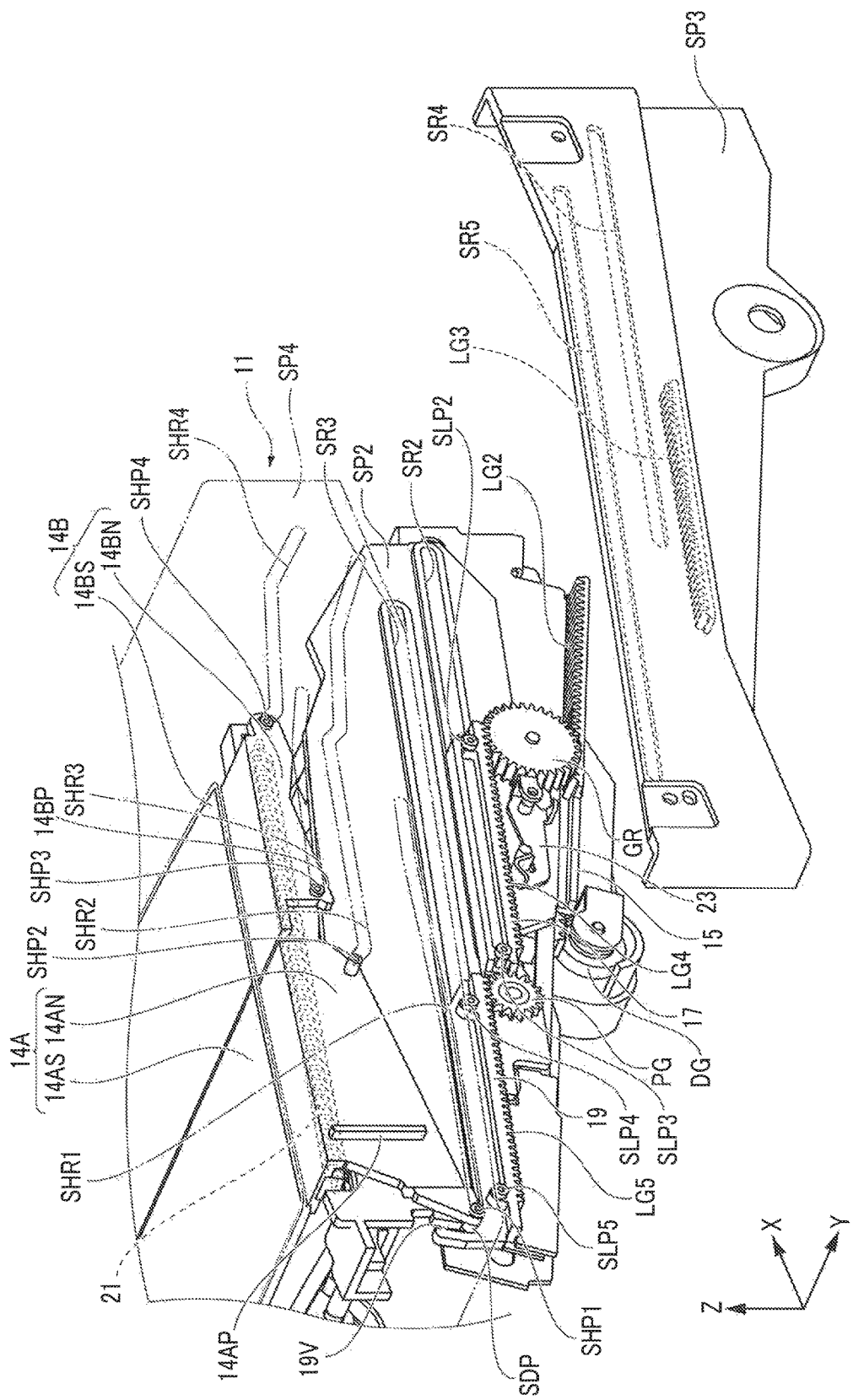
FIG. 6 is an exploded perspective view illustrating the entire displacement mechanism of the display device according to the first embodiment.

FIG. 6 illustrates the shutter 14 and a shutter actuation mechanism. As described above, the drive plate 15 is driven by the drive gear DG and moved in the back-and-forth direction of the display device 10 relative to the slide pins SLP1 (see FIG. 4).

A shutter drive mechanism inner plate SP2 is a planar member which is formed outside the drive plate guide plate SP1, and is one of the plurality of plate structures that are included in the side plates SP. On the outer surface of the shutter drive mechanism inner plate SP2, that is, on the side opposite to the drive plate guide plate SP1, there is provided a slide rail SR2 having an elongated hole shape that extends in the back-and-forth direction of the display device 10. Furthermore, on the slide rail SR2, there is provided a slide rail SR3 which extends along the extending direction of SR2 and which is offset with respect to the slide rail SR2 in the back-and-forth direction thereof.

In the lower region of the shutter drive mechanism inner plate SP2, there is provided a rotational gear GR which is rotatable about a rotation axis that is perpendicular to a plate surface of the shutter drive mechanism inner plate SP2. The rotational gear GR is mated with the rack gear LG2 of the drive plate 15. That is, the rotational gear GR is configured to be rotated in response to the drive plate 15 being slidingly moved.

A shutter drive mechanism outer plate SP3 is a planar member which is formed outside the shutter drive mechanism inner plate SP2, and is one of the plurality of plate structures included in the side plates SP. Inside the shutter drive mechanism outer plate SP3, that is, on the surface opposed to the shutter drive mechanism inner plate SP2, there are formed slide rails SR4 and SR5 at positions opposed to the slide rails SR2 and SR3. Furthermore, below the slide rail SR4, there is provided a rack gear LG3 serving as a first rack gear which is formed on a portion protruded toward the shutter drive mechanism inner plate SP2. The rack gear LG3 extends with the tooth surface oriented upwardly along the slide rail SR4.

A doubling slide lever 17 serving as a first sliding member is an elongated shape member which has a longitudinal direction in the back-and-forth direction of the display device 10. The doubling slide lever 17 is provided with two pairs of slide pins SLP2 and SLP3 which are located side by side in the back-and-forth direction of the display device 10 and protruded in the width direction from both sides of the doubling slide lever 17 (the pins oriented toward the shutter drive mechanism inner plate SP2 are not illustrated).

The two pairs of slide pins SLP2 and SLP3 are inserted into the slide rail SR2 of the shutter drive mechanism inner plate SP2 and the slide rail SR4 of the shutter drive mechanism outer plate SP3, respectively. That is, the doubling slide lever 17 is configured to be slidable along the slide rails SR2 and SR4.

On the lower surface of the doubling slide lever 17, there is provided a rack gear LG4 serving as a driven rack gear which extends along the longitudinal direction of the doubling slide lever 17. The rack gear LG4 is mated with the rotational gear GR. That is, the rotational gear GR rotated by the sliding movement of the drive plate 15 causes the doubling slide lever 17 to slidingly move.

In a rear region of the doubling slide lever 17, there is provided a pinion gear PG which is secured to the doubling slide lever 17 so as to be rotatable about a rotation axis perpendicular to the plate surface of the shutter drive mechanism inner plate SP2. The pinion gear PG is mated with the rack gear LG3 of the shutter drive mechanism outer plate SP3. That is, the sliding movement of the doubling slide lever 17 will cause the pinion gear PG to be rotated forward in the sliding movement direction.

A shutter driving lever 19 serving as a second sliding member is an elongated shape member which has a longitudinal direction in the back-and-forth direction of the display device 10. The shutter driving lever 19 is provided with two pairs of slide pins SLP4 and SLP5 which are located side by side in the back-and-forth direction of the display device 10 and protruded in the width direction from both sides of the shutter driving lever 19 (the pins oriented toward the shutter drive mechanism inner plate SP2 are not illustrated).

The two pairs of slide pins SLP4 and SLP5 are inserted into the slide rail SR3 of the shutter drive mechanism inner plate SP2 and the slide rail SR5 of the shutter drive mechanism outer plate SP3, respectively. That is, the shutter driving lever 19 is configured to be slidable along the slide rails SR3 and SR5.

On the lower surface of the shutter driving lever 19, there is provided a rack gear LG5 serving as a second rack gear which extends along the longitudinal direction of the shutter driving lever 19. The rack gear LG5 is mated with the pinion gear PG.

Thus, when the doubling slide lever 17 slidingly moves, the shutter driving lever 19 is moved by the amount of movement which is obtained by adding the amount of movement to be transferred by the rotation of the pinion gear PG to the amount of movement of the doubling slide lever 17 (the translational movement of the pinion gear PG). That is, the shutter driving lever 19 is to make a translational movement by the amount of movement that is greater than the amount of movement of the doubling slide lever 17 (twice the amount of movement of the doubling slide lever 17).

The shutter driving lever 19 has a shutter holding groove 19V at a rear end. The shutter holding groove extends along the vertical direction of the display device 10 and perpendicular to the sliding direction of the shutter driving lever 19. Furthermore, the shutter holding groove 19V has an upper open end.

In other words, the doubling slide lever 17, the pinion gear PG, the rack gear LG3 of the shutter drive mechanism outer plate SP3, and the shutter driving lever 19 constitute the doubling mechanism (a double stroke mechanism) of the amount of movement (stroke). That is, the doubling slide lever 17, the pinion gear PG, the rack gear LG3 of the shutter drive mechanism outer plate SP3, and the shutter driving lever 19 form a drive (mechanics) transfer unit that is engaged with the drive plate 15 via the rotational gear GR.

Furthermore, the pinion gear PG, and the rack gear LG3 and the rack gear LG5 that are each mated with the pinion gear PG form a transfer mechanism for doubling the amount of movement of the doubling slide lever 17 and transferring the resulting amount to the shutter driving lever 19. The transfer mechanism is included in the aforementioned drive transfer unit.

A shutter guide plate SP4 is a planar member which is formed outside the shutter drive mechanism inner plate SP2 and one of the plurality of plate structures included in the side plates SP. Inside the shutter guide plate SP4, that is, on the surface opposed to the shutter drive mechanism inner plate SP2, there are provided shutter rails SHR1, SHR2, SHR3, and SHR4 which extend in the back-and-forth direction of the display device 10 and are arranged from below so as to overlap each other, one above another, in the vertical direction of the display device 10.

The shutter 14 moves along the inner side of the top plate TP and includes the shutter member 14A serving as one member disposed at the rear of the display device 10 and the shutter member 14B serving as the other member disposed at the front thereof when the opening OP is closed. Hereafter, the shutter member 14A may also be referred to as the main shutter 14A and the shutter member 14B as the sub-shutter 14B. The main shutter 14A has a planar shutter unit 14AS for covering part of the opening OP at the time of non-display operation, that is, when the opening OP is closed. On both ends of the shutter unit 14AS in the width direction (in the Y-axis direction), there is formed a planar guided part 14AN which extends in a direction perpendicular to the plate surface of the shutter unit 14AS.

On the rear end of the guided part 14AN, there is provided a shutter pin SHP1 which is protruded outwardly, that is, toward the shutter guide plate SP4. In front of the shutter pin SHP1 or in a front region of the guided part 14AN, there is provided a shutter pin SHP2 which is protruded outwardly, that is, toward the shutter guide plate SP4. The shutter pin SHP1 is inserted into the shutter rail SHR1 and the shutter pin SHP2 into the shutter rail SHR2, respectively. That is, the main shutter 14A is configured to be slidable along the shutter rails SHR1 and 2 in the back-and-forth direction of the display device 10.

On the side of the rearmost end of the guided part 14AN opposite to the shutter pin SHP1, there is provided a shutter drive pin SDP which is protruded inwardly, that is, toward the shutter driving lever 19. The shutter drive pin SDP is inserted slidably into the shutter holding groove 19V. That is, the sliding movement of the shutter driving lever 19 causes the shutter drive pin SDP to be moved, so that the main shutter 14A slidingly moves.

At a rear portion of the guided part 14AN, there is provided an acting projection 14AP serving as a projected part which is protruded outwardly from the guided part 14AN, that is, toward the shutter guide plate SP4. The acting projection 14AP extends in the vertical direction of the display device 10 at an angle relative to the sliding direction of the main shutter 14A (in the figure, for example, perpendicularly).

The sub-shutter 14B has a planar shutter unit 14BS for covering part of the opening OP at the time of non-display operation, that is, when the opening OP is closed. On both ends of the shutter unit 14BS in the width direction (in the Y-axis direction), there is formed a planar guided part 14BN which extends in a direction perpendicular to the plate surface of the shutter unit 14BS.

On the rear end of the guided part 14BN, there is provided a shutter pin SHP3 which is protruded outwardly, that is, toward the shutter guide plate SP4. In front of the shutter pin SHP3 or in a front region of the guided part 14BN, there is provided a shutter pin SHP4 which is protruded outwardly, that is, toward the shutter guide plate SP4.

The shutter pin SHP3 is inserted into the shutter rail SHR3 and the shutter pin SHP4 into the shutter rail SHR4, respectively. That is, the sub-shutter 14B is configured to be slidable along the shutter rails SHR3 and SHR4 in the back-and-forth direction of the display device 10.

At a rear end of the guided part 14BN, there is formed an acted projection 14BP which is protruded backward in the display device 10. The acted projection 14BP is in contact with the acting projection 14AP when the main shutter 14A slidingly moves forward in the display device 10.

When the main shutter 14A is located at the rearmost position along the shutter rails SHR1 and SHR2 and the sub-shutter 14B is located at the rearmost position along the shutter rails SHR3 and SHR4, the opening OP is completely covered with the shutter units 14AS and 14BS.

Note that in the width direction of the display device 10, the shutter unit 14BS of the sub-shutter 14B is longer than the shutter unit 14AS of the main shutter 14A. That is, the shutter unit 14BS is wider than the shutter unit 14AS.

In other words, when viewed in the back-and-forth direction of the display device 10, that is, in the sliding direction of the main shutter 14A and the sub-shutter 14B, the guided part 14AN is disposed inside the guided part 14BN so as not to overlap with the guided part 14BN.

Furthermore, as shown in FIG. 6, at the rear end portion, the shutter rail SHR2 is tilted downwardly in the forward direction. Thus, when the main shutter 14A slides forward, the front end of the main shutter 14A first goes downwardly.

That is, when the main shutter 14A slides forward, the front end of the shutter unit 14AS goes below the shutter unit 14BS of the sub-shutter 14B. Thus, when being slidingly moved by the shutter driving lever 19 from the rearmost position, the main shutter 14A slidingly moves without interfering with the sub-shutter 14B for a while.

Then, the main shutter 14A and the sub-shutter 14B overlap each other so that the acting projection 14AP and the acted projection 14BP are brought into contact with each other, thereby allowing the main shutter 14A and the sub-shutter 14B to interfere with each other for the first time. That is, until the main shutter 14A slidingly moves forward and the acting projection 14AP and the acted projection 14BP are brought into contact with each other, the position of the sub-shutter 14B is maintained at the rearmost position.

Note that the sub-shutter 14B is connected to the main-shutter 14A by a spring 21 serving as biasing means with both ends secured to the sub-shutter 14B and main-shutter 14A. That is, the spring 21 provides biasing force so that the main shutter 14A and the sub-shutter 14B overlap each other and the main shutter 14A and the sub-shutter 14B come closer to each other. In other words, the sub-shutter 14B is biased all the time by the spring 21 backwardly in the display device 10.

Note that for example, such a structure may also be acceptable in which one end of the spring 21 is secured to a rear region of the housing, while the other end of the spring 21 is secured to the sub-shutter 14B, so that the sub-shutter 14B is biased backwardly in the display device 10.

[Transition from Non-Display Operating State to Display Operating State]

Now, referring to FIG. 7 to FIG. 9, which are side views of the display device 10, a description will now be given of the transition from the non-display operating state to the display operating state of the display device 10. Note that in FIG. 7 to FIG. 9, the shutter drive mechanism outer plate SP3 is omitted.

Figure 7:
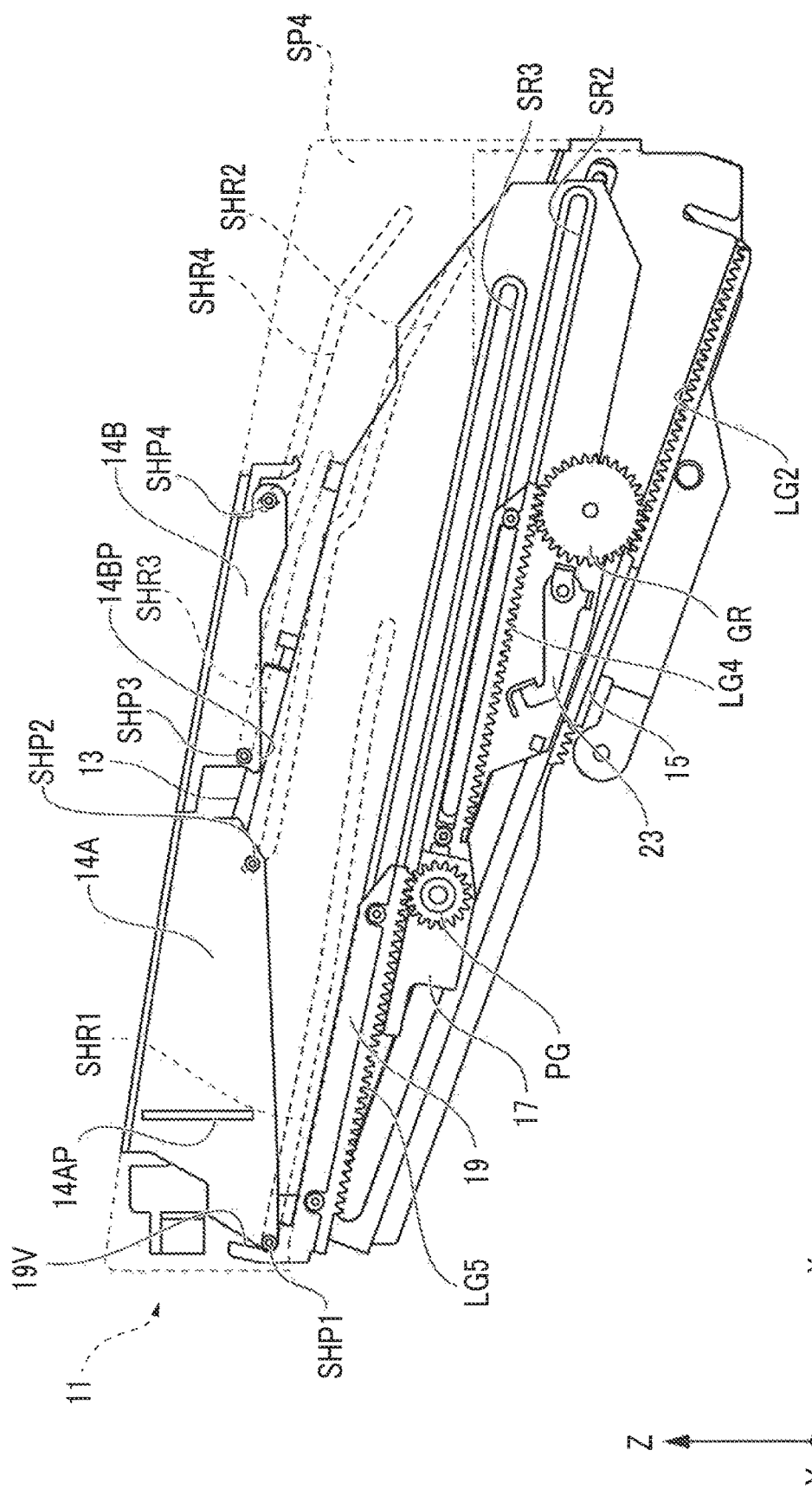
FIG. 7 is a side view illustrating the transition from a non-display operating state to a display operating state of the display device according to the first embodiment.

FIG. 7 is a side view of the display device 10 in the non-display operating state. In this state, the drive plate 15 is located at the foremost portion along the slide rails SR1 and SR2. Furthermore, at this time, the drive pin DP of the combiner unit 13 is located in the non-operation cam region CR1. Thus, the combiner unit 13 is in the lying state in the back-and-forth direction of the display device 10, and is completely accommodated in the housing 11.

Furthermore, the doubling slide lever 17 and the shutter driving lever 19 are located at the rearmost position along the slide rails SR2 and SR4 and the slide rails SR3 and SR5, respectively. Thus, the main shutter 14A and the sub shutter 14B are also located at the rearmost position along the shutter rails SHR1 and SHR2 and the shutter rails SHR3 and SHR4, respectively, and the opening OP is completely covered with the shutter 14.

In the state of FIG. 7, that is, in the state where the drive pin DP of the combiner unit 13 is engaged with the non-operation cam region CR1, the rack gear LG2 is engaged via the rotational gear GR with the fourth rack gear LG4 that is part of the drive transfer unit.

Figure 8:
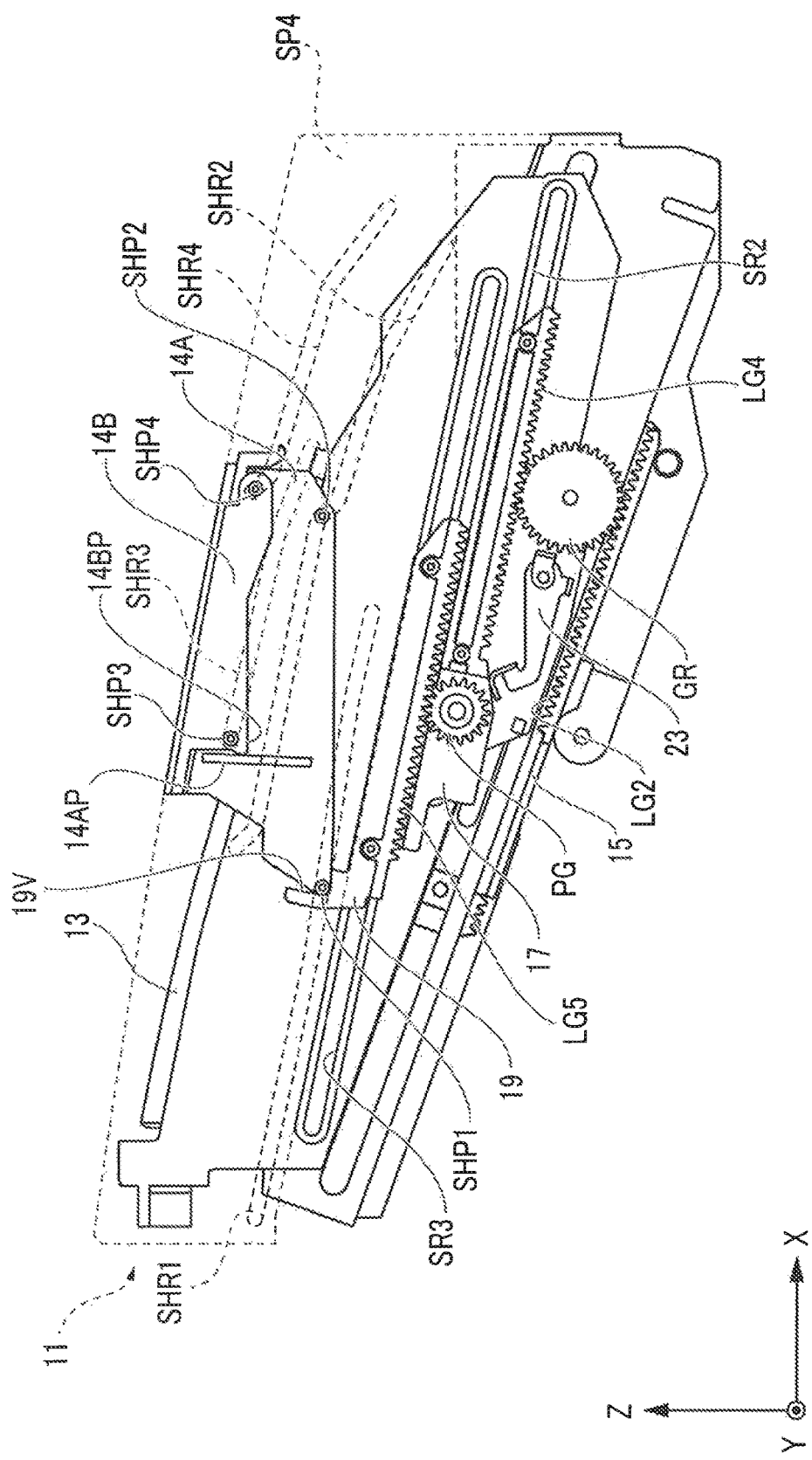
FIG. 8 is a side view illustrating the transition from a non-display operating state to a display operating state of the display device according to the first embodiment.

FIG. 8 is a side view of the display device 10 when the shutter 14 is moved so as to open the opening OP approximately halfway. At this time, the drive plate 15 has slidingly moved backward from the state at the time of non-display operation, that is, backward from the foremost portion.

Furthermore, at this time, the drive pin DP of the combiner unit 13 is located in a transition region from the non-operation cam region CR1 to the development cam region CR2. That is, the combiner unit 13 has not yet moved from the aforementioned state of FIG. 7, or alternatively has started to slightly rotate about the rotation axis pin AP (see FIG. 4) and rise.

Furthermore, the doubling slide lever 17 moves forward, and in response thereto, the shutter driving lever 19 also moves forward. Thus, the main shutter 14A slidingly moves forward. As described above, until the main shutter 14A slidingly moves forward, and the acting projection 14AP and the acted projection 14BP are brought into contact with each other, the position of the sub-shutter 14B is maintained at the rearmost position.

In FIG. 8, the acting projection 14AP of the main shutter 14A having slid forward and the acted projection 14BP of the sub-shutter 14B are brought into contact with each other. Thus, after that, when the main shutter 14A further slidingly moves forward, the sub-shutter 14B is to slidingly move forward in response thereto.

At this time, as described above, the sub-shutter 14B is biased by the spring 21 backward in the display device 10. That is, the sub-shutter 14B is biased by the spring 21 in a direction opposite to the direction in which the sub-shutter 14B is pushed by the acting projection 14AP. Thus, force acts upon the acting projection 14AP and the acted projection 14BP so as to be pushed against each other.

Thus, when the main shutter 14A and the sub-shutter 14B slidingly move forward from this state, the acting projection 14AP and the acted projection 14BP are kept in contact with each other. As long as the contact is maintained, the main shutter 14A and the sub-shutter 14B are overlapped and slidingly move together.

Figure 9:
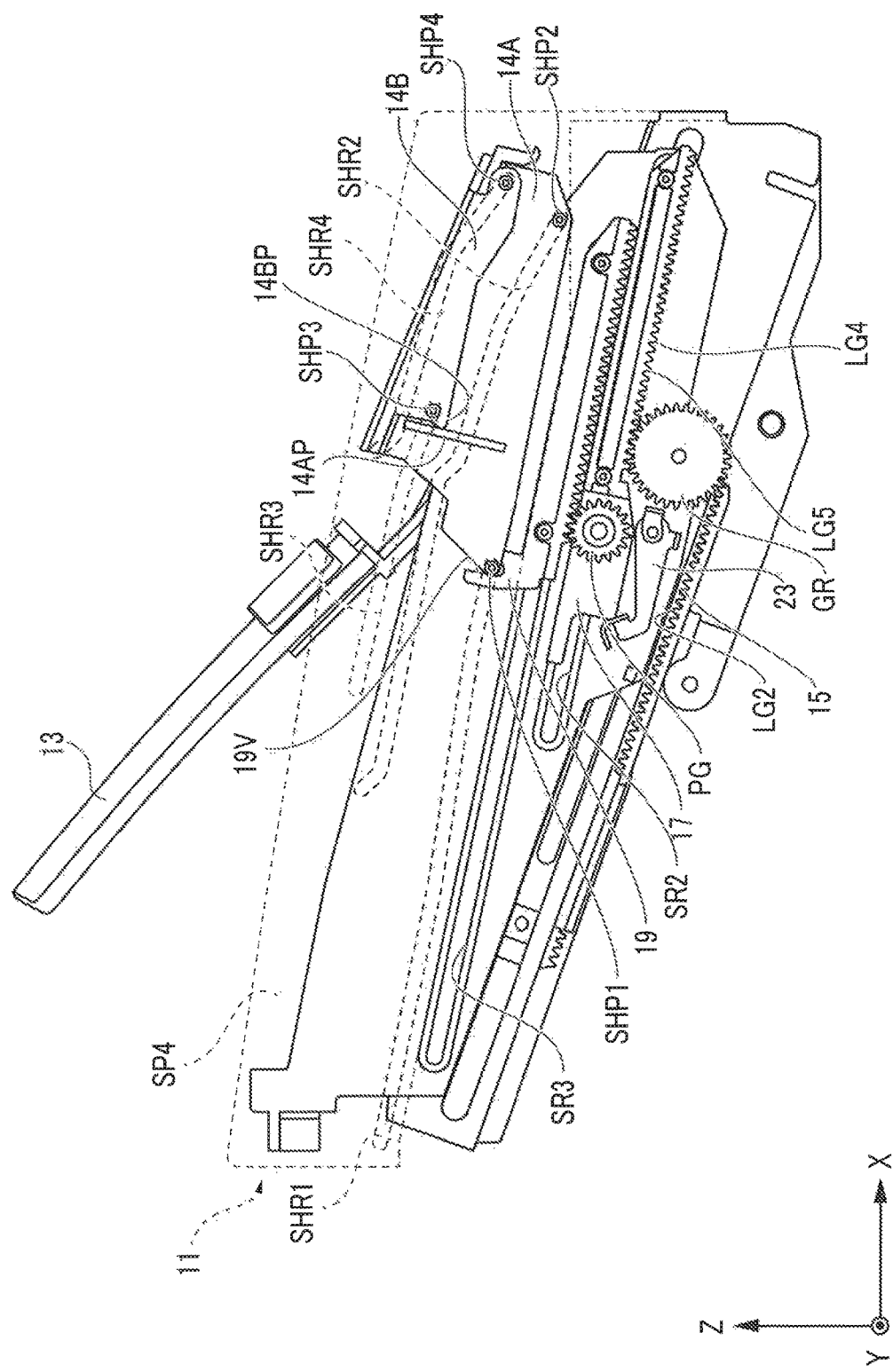
FIG. 9 is a side view illustrating the transition from a non-display operating state to a display operating state of the display device according to the first embodiment.

FIG. 9 is a side view illustrating the display device 10 in the state in which the shutter 14 has been retracted forward relative to the opening OP and the opening OP is completely opened. At this time, the drive plate 15 has slidingly moved further backward from the state of FIG. 8.

Furthermore, at this time, the drive pin DP of the combiner unit 13 is located in the development cam region CR2 that is part of the second cam region. That is, the combiner unit 13 has started to rotate about the rotation axis pin AP from the state of FIG. 8 mentioned above and pass through the opening OP to be developed toward outside the housing 11.

Furthermore, the doubling slide lever 17 has moved to the foremost portion, and the shutter driving lever 19 has also moved to the foremost portion. That is, the main shutter 14A has been brought to the foremost portion along the shutter rails SHR1 and SHR2. Furthermore, the sub-shutter 14B and the main shutter 14A overlapping with each other have also been brought to the foremost portion all together along the shutter rails SHR3 and SHR4.

As shown in FIG. 9, in this state, the rotational gear GR is mated with the foremost portion of the rack gear LG2. Therefore, further rearward sliding movement of the drive plate 15 will cause the rotational gear GR and the rack gear LG2 to be demated from each other. That is, further rearward sliding of the drive plate 15 would not cause the doubling slide lever 17 to slidingly move.

In other words, when the drive pin DP of the combiner unit 13 is engaged with part of the development cam region CR2 serving as part of the second cam region and the adjustment cam region CR3, the rack gear LG2 is not engaged via the rotational gear GR with the rack gear LG4 that is part of the drive transfer unit.

When the drive plate 15 further moves backward from this state, the drive pin DP of the combiner unit 13 reaches the adjustment cam region CR3, and the combiner unit 13 passes through the opening OP and is completely developed outside the housing 11, leading to the state of FIG. 1, that is, the display operating state.

Note that a stopper 23 shown in FIG. 6 to FIG. 9 may be provided in order to secure the doubling slide lever 17. That is, when the doubling slide lever 17 slides forward and the rack gear LG4 and the rotational gear GR are demated from each other, the stopper 23 rotates as shown in FIG. 9. It may also be acceptable that this allows the doubling slide lever 17 to be engaged and prevents the same from being slid backward due to other than power transfer from the rack gear LG2 via the rotational gear GR.

When the drive plate 15 slidingly moves back and forth while the drive pin DP is located in the adjustment cam region CR3 as described above, the combiner unit 13 slightly rotates. That is, the angle adjustment operation of the combiner unit 13 is performed.

According to the display device 10 of the aforementioned embodiment, the two shutter members 14A and 14B are disposed side by side at the time of non-display operation and cover the opening OP. Then, at the time of display operation, the two shutter members 14A and 14B, while being stacked one on the other, are accommodated into the housing 11. Thus, at the time of display operation, it is possible to reduce the space for accommodating the shutter members 14A and 14B, thereby enabling the display device 10 to be reduced in size.

Furthermore, according to the display device 10 of the aforementioned embodiment, the drive plate 15 is slidingly moved, thereby enabling both the combiner unit 13 and the shutter 14 to be moved. This makes it possible to reduce driving sources (into a single one), simplify the displacement mechanism, and reduce a parts count. Furthermore, the displacement mechanism can be provided (integrated) on the side plate SP of the housing 11, thereby enabling the space between the side plates SP to be effectively exploited.

Furthermore, in the display device 10 of the aforementioned embodiment, the movement doubling mechanism that is constituted by the doubling slide lever 17, the pinion gear PG, the rack gear LG3, and the shutter driving lever 19 slidingly moves the shutter 14. This makes it possible to move the shutter 14 only by part of the entire amount of sliding movement (stroke) of the drive plate 15.

Thus, for example, it is possible to rotate the combiner unit 13 by the entire or part of the stroke of the drive plate 15, and move the shutter by another part of the stroke of the drive plate 15. That is, only the simple sliding movement of the drive plate 15 makes it possible to operate the combiner unit 13 and the shutter 14 flexibly in various patterns, for example, with time difference.

Note that when the displacement mechanism is provided symmetrically on both of the pair of the side plates SP, it suffices that the drive plate 15 and the drive gear DG are provided on one of the side plates SP. At this time, a shaft may be passed through both sides of the side plates SP along the width direction (Y direction) of the display device 10, and then a gear may be provided on both ends of the shaft to be mated with the rotation gear GR or the like, so that power is transferred from one rotation gear GR to the other rotation gear GR.

Furthermore, when the displacement mechanism is provided on one of the side plates SP, it suffices that the other side plate is provided with the clearance hole PH, and the shutter rails SHR1, SHR2, SHR3, and SHR4.

In the aforementioned descriptions, the transition operation from the non-display operating state to the display operating state was described; however, when a transition is made from the display operating state to the non-display operating state, an operation opposite to the transition operation from the aforementioned non-display operating state to the display operating state is performed.

That is, from the state of FIGS. 1 and 4, the drive plate 15 slidingly moves forward in the display device 10 and sequentially transitions as shown in FIG. 9, FIG. 8, and FIG. 7; the combiner unit 13 rotates to be accommodated in the housing 11; and the shutter 14 slides to cover the opening OP.

Those various configurations in the aforementioned embodiment have been presented only by way of example, and thus may be selected as appropriate depending on, for example, usage.

REFERENCE SIGNS LIST 10 display device
11 housing
13 combiner unit
14 shutter
14A shutter member
14B shutter member
14AP acting projection
14BP acted projection
15 drive plate
17 doubling slide lever
19 shutter driving lever
21 spring
CR cam groove
TP top plate
SP side plate
OP opening
DP drive pin
AP rotation axis pin
PH clearance hole
GR rotational gear
PG pinion gear
LG1 rack gear
LG2 rack gear
LG3 rack gear
LG4 rack gear
LG5 rack gear

The invention claimed is:

1. A display device comprising:
   a housing having a top plate with an opening and a pair of opposed side plates;
   a drive member which is provided on at least one of said pair of side plates and slidable along said at least one of said pair of side plates, said drive member having a cam structure and a drive rack gear;
   a display member that is engaged with said cam structure and movable through said opening; and
   a shutter configured to open and close said opening along said top plate by a drive transfer unit that is engaged with said drive rack gear,
   wherein said cam structure includes a first cam region formed in parallel to a sliding direction of said drive member and a second cam region formed at an angle to said sliding direction, said drive rack gear is engaged with said drive transfer unit when said display member is engaged with said first cam region, and said drive rack gear is not engaged with said drive transfer unit when said display member is engaged with part of said second cam region.

2. The display device according to claim 1, wherein said cam structure has a third cam region, and said third cam region extends at an angle relative to said sliding direction less than that of said second cam region.

3. The display device according to claim 1, wherein said shutter includes one member that is engaged with said drive transfer unit and movable along said top plate, and other one or more members to be moved by said one member.

4. The display device according to claim 3, wherein said one member has a projected part, and said other one or more members move in conjunction with said one member by being brought into contact with said projected part.

5. The display device according to claim 4, wherein said other one or more members are biased in a direction opposite to a direction in which the other one or more members are pushed by being brought into contact with said projected part.

6. The display device according to claim 4, wherein said other one or more members are brought into contact with said projected part when said one member is overlapped with said one or more other members in a direction perpendicular to a plate surface of said top plate.

7. The display device according to claim 1, wherein said drive transfer unit includes:
   a first sliding member which is engaged with said drive rack gear, provided on at least one of said pair of side plates, and slidable along at least one of said side plates;
   a second sliding member which is provided on said at least one of said pair of side plates and slidable along said at least one of said side plates; and
   a transfer mechanism configured to double an amount of movement of said first sliding member and transfer the doubled amount of movement to said second sliding member.

8. The display device according to claim 7,
   wherein said first sliding member has a drive rack gear which is provided on one of said pair of side plates and is engaged with said drive rack gear via a rotational gear, and
   wherein said transfer mechanism includes a pinion gear rotatably provided on said first sliding member, a first rack gear which is provided on at least one of said pair of side plates and mated with said pinion gear, and a second rack gear which is provided on said second sliding member and mated with said pinion gear.

* * * * *